US012579704B2

(12) United States Patent
Hua et al.

(10) Patent No.: US 12,579,704 B2
(45) Date of Patent: Mar. 17, 2026

(54) VIDEO GENERATION METHOD AND APPARATUS, DEVICE, AND STORAGE MEDIUM

(71) Applicant: Beijing Zitiao Network Technology Co., Ltd., Beijing (CN)

(72) Inventors: Miao Hua, Beijing (CN); Bingchuan Li, Beijing (CN)

(73) Assignee: Beijing Zitao Network Technology Co., Ltd., Beijing (CN)

( * ) Notice: Subject to any disclaimer, the term of this patent is extended or adjusted under 35 U.S.C. 154(b) by 65 days.

(21) Appl. No.: 18/565,927

(22) PCT Filed: Apr. 24, 2022

(86) PCT No.: PCT/CN2022/088699
§ 371 (c)(1),
(2) Date: Nov. 30, 2023

(87) PCT Pub. No.: WO2022/252871
PCT Pub. Date: Dec. 8, 2022

(65) Prior Publication Data

US 2024/0362828 A1 Oct. 31, 2024

(30) Foreign Application Priority Data

May 31, 2021 (CN) ......................... 202110597283.2

(51) Int. Cl.
*G06T 11/00* (2006.01)
*G06T 3/40* (2006.01)
(Continued)

(52) U.S. Cl.
CPC ................ *G06T 11/00* (2013.01); *G06T 3/40* (2013.01); *G06T 7/73* (2017.01); *G06V 10/774* (2022.01);
(Continued)

(58) Field of Classification Search
CPC ... G06T 11/00; G06T 7/73; G06T 3/40; G06T 2207/20081; G06T 2207/30201; G06V 40/193; G06V 10/774; G06V 10/80
(Continued)

(56) References Cited

U.S. PATENT DOCUMENTS 6,351,269 B1 2/2002 Georgiev
2011/0227932 A1 9/2011 Lu et al.
(Continued)

FOREIGN PATENT DOCUMENTS

CN 101436312 A 5/2009
CN 101510314 A 8/2009
(Continued)

OTHER PUBLICATIONS

International Search Report and Written Opinion received for PCT Patent Application No. PCT/CN2022/088699, mailed on Jul. 4, 2022, 14 pages (7 pages of English Translation and 7 pages of Original Document).

(Continued)

*Primary Examiner* — Jin Ge

(57) ABSTRACT

The present disclosure relates to a video generation method and apparatus, a device, and a storage medium. After acquiring one or more images to be processed, a plurality of target images having different degrees of eye opening are generated according to the images to be processed, and a video having a process of gradual eye change is generated on the basis of the plurality of target images.

19 Claims, 3 Drawing Sheets

(51) Int. Cl.

| | |
|---|---|
| ***G06T 7/73*** | (2017.01) |
| ***G06V 10/774*** | (2022.01) |
| ***G06V 10/80*** | (2022.01) |
| ***G06V 40/18*** | (2022.01) |

(52) U.S. Cl.
CPC ............ *G06V 10/80* (2022.01); *G06V 40/193* (2022.01); *G06T 2207/20081* (2013.01); *G06T 2207/30201* (2013.01)

(58) Field of Classification Search
USPC .......................................................... 345/629
See application file for complete search history.

(56) References Cited

U.S. PATENT DOCUMENTS

| | | | | |
|---|---|---|---|---|
| 2013/0079911 | A1 | 3/2013 | Dong et al. | |
| 2020/0118279 | A1* | 4/2020 | Abreu | G06V 10/7557 |
| 2020/0151860 | A1* | 5/2020 | Safdarnejad | G06V 40/175 |
| 2022/0122308 | A1* | 4/2022 | Kalarot | G06T 3/02 |
| 2022/0261070 | A1* | 8/2022 | Zhang | G06V 40/193 |
| 2023/0140313 | A1* | 5/2023 | Xu | G06V 40/193 382/201 |
| 2023/0419490 | A1* | 12/2023 | Koiso | G06T 7/0012 |

FOREIGN PATENT DOCUMENTS

| | | | |
|---|---|---|---|
| CN | 102449664 | A | 5/2012 |
| CN | 111626087 | A | 9/2020 |
| CN | 112381709 | A | 2/2021 |
| CN | 113313790 | A | 8/2021 |

OTHER PUBLICATIONS

Office Action received for Chinese Patent Application No. 202110597283.2, mailed on Aug. 3, 2023, 13 pages (6 pages of English Translation and 7 pages of Original Document).
Office Action received for Chinese Patent Application No. 202110597283.2, mailed on Jan. 12, 2023, 15 pages (6 pages of English Translation and 9 pages of Original Document).
Office Action received for Chinese Patent Application No. 202110597283.2, mailed on Mar. 17, 2023, 13 pages (15 pages of English Translation and 8 pages of Original Document).

* cited by examiner acquiring one or more images to be processed    ⌠S101 adjusting an eye opening degree of an object in the image to be processed based on a preset image processing model to obtain a plurality of target images with the different eye opening degrees;    ⌠S102 generating a video with an eye gradual process based on the plurality of target images.    ⌠S103

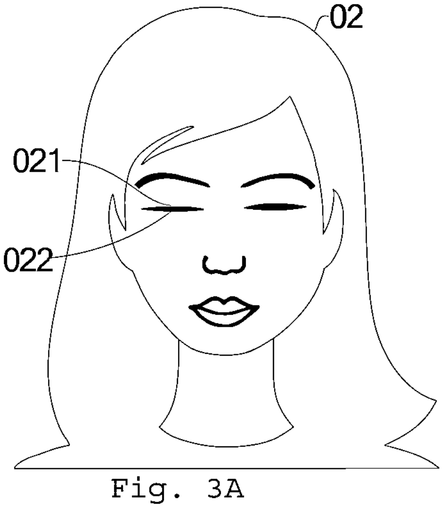

Fig. 3A

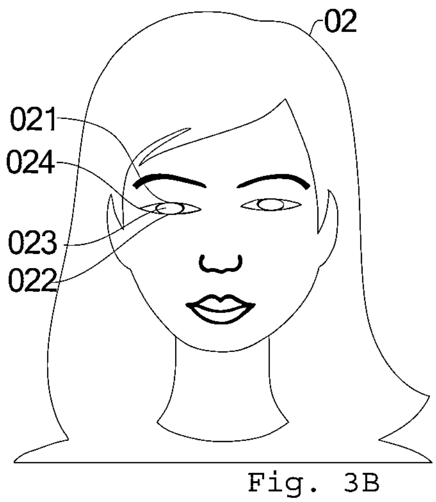

Fig. 3B

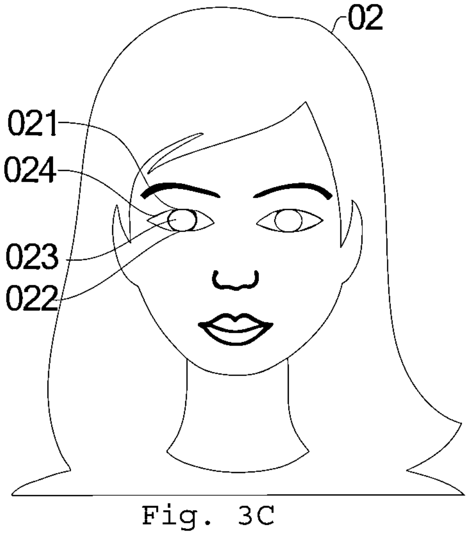

Fig. 3C

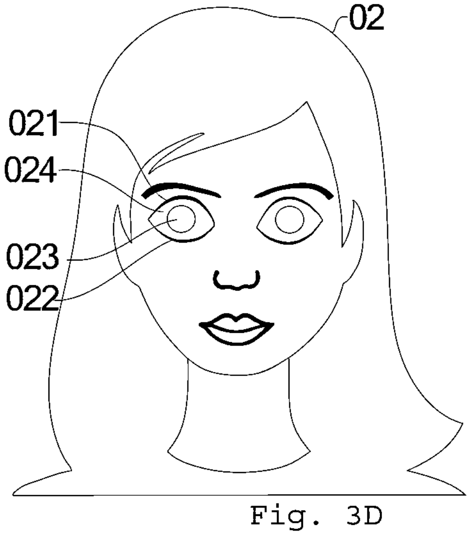

Fig. 3D

┌─────────────────────────────────────────┐
│  determining a position of the eyes of the   │
│  object in the image to be processed based on │─A1
│           the eye key point                │
└─────────────────────────────────────────┘

│
                    ▼

┌─────────────────────────────────────────┐
│  overlaying a preset eye image onto the position │
│  to replace the eyes of the object in the image  │
│  to be processed with eyes in the preset eye    │─A2
│  image, wherein the eyes in the preset eye image │
│         have a preset shape or size          │
└─────────────────────────────────────────┘

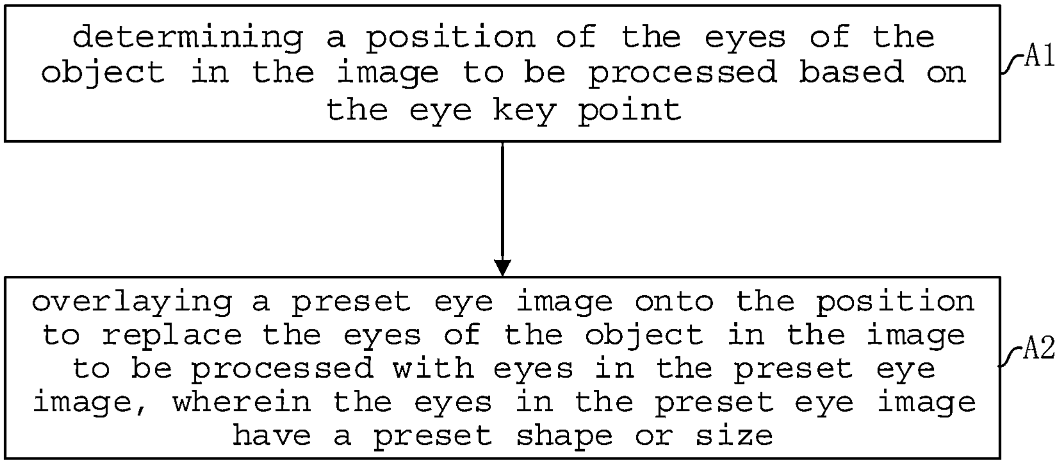

Fig. 4

VIDEO GENERATION METHOD AND APPARATUS, DEVICE, AND STORAGE MEDIUM

CROSS-REFERENCE TO RELATED APPLICATIONS

This application is a U.S. National Stage Application under 35 U.S.C. § 371 of International Patent Application No. PCT/CN2022/088699, filed on Apr. 24, 2022, which is based on and claims the benefit of priority to the Chinese patent application No. 202110597283.2 filed on May 31, 2021, which is hereby incorporated by reference in its entirety into the present application.

TECHNICAL FIELD

The present disclosed embodiments relate to the field of image processing technologies, and in particular, to a video generation method, device, apparatus, and storage medium.

BACKGROUND

In the related art, a user can record life by taking videos, photos and the like, and upload the taken videos or photos to a video application for other video consumers to watch.

SUMMARY

In one aspect, the present disclosure provides a video generation method, comprising: acquiring one or more images to be processed; adjusting an eye opening degree of an object in the image to be processed based on a preset image processing model to obtain a plurality of target images with the different eye opening degrees; generating a video with an eye gradual process based on the plurality of target images, the eye gradual process comprising at least one of an eye opening gradual process or an eye closing gradual process.

In some embodiments, the image processing model is trained based on a plurality of training images with the different eye opening degrees and eye opening degree data corresponding to each training image of the plurality of training images.

In some embodiments, the image processing model is trained based on a plurality of training images with the different eye opening degrees and an eye key point on each training image of the plurality of training images.

In some embodiments, the plurality of training images are generated based on a plurality of fusion models, the plurality of fusion models are obtained by fusing a plurality of image generation models according to different weight ratios, and images generated by the different image generation models have the different eye opening degrees.

In some embodiments, the plurality of image generation models comprise a first model for generating an eye opening image and a second model for generating an eye closing image.

In some embodiments, prior to adjusting an eye opening degree of an object in the image to be processed based on a preset image processing model to obtain a plurality of target images with the different eye opening degrees, the method further comprises: extracting an eye key point of the object from the image to be processed, and processing eyes of the object in the image to be processed into at least one of eyes with a preset shape or eyes with a preset size based on the eye key point.

In some embodiments, the processing the eyes of the object in the image to be processed into at least one of eyes with a preset shape or eyes with a preset size based on the eye key point comprises: determining a position of the eyes of the object in the image to be processed based on the eye key point; overlaying a preset eye image onto the position to replace the eyes of the object in the image to be processed with eyes in the preset eye image, wherein the eyes in the preset eye image with at least one of the preset shape or the preset size.

In some embodiments, the processing the eyes of the object in the image to be processed into at least one of eyes with a preset shape or eyes with a preset size based on the eye key point comprises: adjusting a position of the eye key point in the image to be processed based on at least one of a preset eye shape parameter or a preset eye size parameter to make the eyes in the image to be processed have at least one of the preset shape or the preset size.

In some embodiments, the adjusting an eye opening degree of an object in the image to be processed based on a preset image processing model to obtain a plurality of target images with the different eye opening degrees comprises: in a case where the one or more images to be processed comprises a plurality of images, for each image of the one or more images to be processed, inputting the image and target eye opening degree data randomly generated for the image into the image processing model, so that the image processing model adjusts the eye opening degree of the object in the image based on the target eye opening degree data so as to obtain a target image with the eye opening degree matched with the target eye opening degree data.

In some embodiments, the adjusting an eye opening degree of an object in the image to be processed based on a preset image processing model to obtain a plurality of target images with the different eye opening degrees comprises: in a case where the one or more images to be processed comprises a plurality of images, for each image of the one or more images to be processed, determining a value of a preset parameter when the image is input into the image processing model, and taking the value as the target eye opening degree data corresponding to the image, the value of the preset parameter gradually changing; inputting the target eye opening degree data corresponding to the image into the image processing model, so that the image processing model adjusts the eye opening degree of the object in the image based on the target eye opening degree data so as to obtain a target image with the eye opening degree matched with the target eye opening degree data.

In some embodiments, before the determining a value of a preset parameter when the image is input into the image processing model, and the method further comprises: acquiring configuration data of the preset parameter based on a target control displayed on an interface, the configuration data comprising a changing amplitude and a changing period; the determining a value of a preset parameter when the image is input into the image processing model comprises: determining the value of the preset parameter when the image is input into the image processing model based on the changing amplitude and the changing period.

In some embodiments, the adjusting an eye opening degree of an object in the image to be processed based on a preset image processing model to obtain a plurality of target images with the different eye opening degrees comprises: in a case where the one or more images to be processed comprises one image, inputting the one or more images to be processed and multiple different target eye opening degree data into the image processing model, so that the image processing model adjusts the eye opening degree of the object in the image based on each said target eye opening degree data respectively so as to obtain the target image corresponding to each said target eye opening degree data.

In another aspect, the present disclosure provides a video generation device, comprising: an image acquisition unit for acquiring an image to be processed; a target image generation unit for adjusting an eye opening degree of an object in the image to be processed based on a preset image processing model to obtain a plurality of target images with the different eye opening degrees; a video generation unit for generating a video with an eye gradual process based on the plurality of target images.

In some embodiments, the image processing model is trained based on a plurality of training images with different eye opening degrees and eye opening degree data corresponding to each training image of the plurality of training images.

In some embodiments, the image processing model is trained based on a plurality of training images with different eye opening degrees and an eye key point on each training image of the plurality of training images.

In some embodiments, the plurality of training images are generated based on a plurality of fusion models, the plurality of fusion models are obtained by fusing a plurality of image generation models according to different weight ratios, and the images generated by different image generation models have different eye opening degrees.

In some embodiments, the plurality of image generation models comprise a first model for generating an eye opening image and a second model for generating an eye closing image.

In some embodiments, the video generation device further comprises: an image modification unit for extracting an eye key point of the object from the image to be processed, and processing the eyes of the object in the image to be processed into at least one of eyes with a preset shape or eyes with a preset size based on the eye key point.

In some embodiments, the image modification unit comprises: a position determining subunit for determining a position of the eyes of the object in the image to be processed based on the eye key point; a first image modification subunit for overlaying a preset eye image onto the position to replace the eyes of the object in the image to be processed with eyes in the preset eye image, wherein the eyes in the preset eye image have a preset shape and/or size.

In some embodiments, the image modification unit further comprises a second image modification subunit for adjusting the a position of the eye key point in the image to be processed based on at least one of a preset eye shape parameter or a preset eye size parameter to make the eyes in the image to be processed have at least one of the preset shape or the preset size.

In some embodiments, the target image generation unit is used for, in a case where the one or more images to be processed comprises a plurality of images, for each image of the one or more images to be processed, inputting the image and target eye opening degree data randomly generated for the image into the image processing model, so that the image processing model adjusts the eye opening degree of the object in the image based on the target eye opening degree data so as to obtain a target image with the eye opening degree matched with the target eye opening degree data.

In some embodiments, the target image generating unit is used for, in a case where the one or more images to be processed comprises a plurality of images, for each image of the one or more images to be processed, determining a value of a preset parameter when the image is input into the image processing model, and taking the value as the target eye opening degree data corresponding to the image, the value of the preset parameter gradually changing; and, inputting the target eye opening degree data corresponding to the image into the image processing model, so that the image processing model adjusts the eye opening degree of the object in the image based on the target eye opening degree data so as to obtain a target image with the eye opening degree matched with the target eye opening degree data.

In some embodiments, a variation range determining unit is used for acquiring configuration data of the preset parameter based on a target control displayed on an interface, the configuration data comprising a changing amplitude and a changing period; the target image generation unit determines the value of the preset parameter when the image is input into the image processing model based on the changing amplitude and the changing period.

In some embodiments, in a case where the one or more images to be processed comprises one image, the target image generation unit inputs the image and multiple different target eye opening degree data into the image processing model, so that the image processing model adjusts the eye opening degree of the object in the image based on each said target eye opening degree data respectively so as to obtain a target image corresponding to each said target eye opening degree data.

In yet another aspect, the present disclosure provides an electronic apparatus, comprising: a memory and a processor, wherein the memory has stored therein a computer program which, when executed by the processor, implements the method of any of the preceding claims.

In a further aspect, the present disclosure provides a non-transitory computer readable storage medium having stored therein a computer program which, when executed by a processor, implements the method of any of the preceding claims.

In yet another aspect, the present disclosure provides a computer program comprising: instructions which, when executed by a processor, cause the processor to perform the video generation method according to any of the embodiments described above.

In yet another aspect, the present disclosure provides a computer program product comprising instructions which, when executed by a processor, cause the processor to perform the video generation method according to any of the above embodiments.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

In order to more clearly illustrate the embodiments or technical solutions in the related art of the present disclosure, the drawings used in the embodiments or technical solutions in the related art description will be briefly described below, and it is obvious for those skilled in the art that other drawings can be obtained according to these drawings without inventive labor.

FIGS. 3A-3D are a plurality of target images with different eye opening degrees generated based on the image to be processed in FIG. 2.

FIG. 4 is a flow chart of using method A to adjust a shape and size of an eye in the image to be processed.

DETAILED DESCRIPTION

In order that the above objects, features and advantages of the present disclosure may be more clearly understood, aspects of the present disclosure will be further described below. It should be noted that, in the case of no conflict, the embodiments and features in the embodiments of the present disclosure may be combined with each other.

In the following description, numerous specific details are set forth in order to provide a thorough understanding of the present disclosure, but the present disclosure may be practiced otherwise than as described herein. It is to be understood that the embodiments disclosed in the Specification are only part of embodiments of the present disclosure, and not all embodiments.

With the development of video applications, the growing user demands cannot be met by simple video shooting or picture shooting. Therefore, how to process videos and images and improve the interestingness of videos and pictures are technical problems which needs to be solved urgently at present.

In order to solve the technical problems or at least partially solve the technical problems, embodiments of the present disclosure provide a video generation method, device, apparatus, and storage medium.

Figure 1:
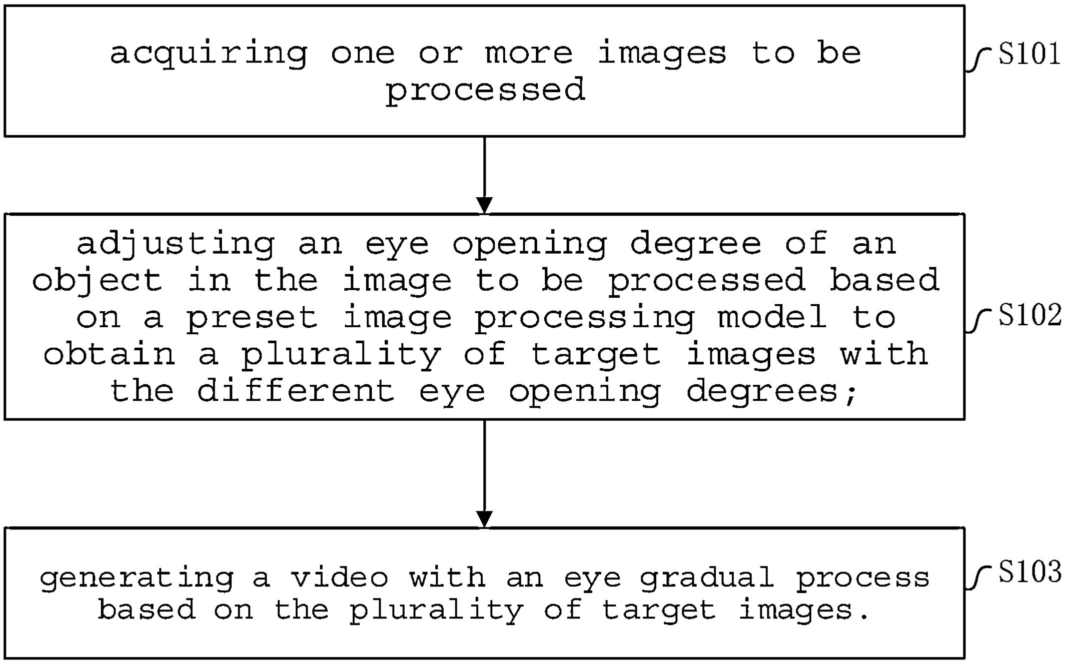
FIG. 1 is a flow chart of a video generation method provided by some embodiments of the present disclosure.

FIG. 1 is a flow chart of a video generation method provided by some embodiments of the present disclosure, which may be performed by an electronic apparatus having image processing capability.

In practical applications, the electronic apparatus may be at least a terminal apparatus such as a mobile phone, a tablet computer, a desktop computer, and an all-in-one machine, and may also be a server which is connected to the terminal apparatus and receives image data collected by the terminal apparatus.

As shown in FIG. 1, a video generation method provided by some embodiments of the present disclosure comprises steps S101 to S103.

In S101: acquiring one or more images to be processed.

The image to be processed in some embodiments of the present disclosure is an image comprising object information, and the image comprises an eye organ of the object.

The object may be a human or animal having an eyelid, the degree of palpebral fissure of which is reflected as an eye opening degree of the object.

The image in some embodiments of the present disclosure may be a picture or a video frame image acquired in a preset mode. The preset mode at least comprises shooting, downloading and other modes, but is not limited to shooting and downloading modes.

When the image in some embodiments of the present disclosure is specifically a video frame image, the acquired images to be processed may be a part of or all of the video frame images in certain video data, wherein in a case where the frame frequency of the video data is high, the part of the video frame images in the video data are preferably selected as the images to be processed.

For example, if the frame frequency of the video data is 60 frames/second, one video frame image can be selected from every 20 frames as an image to be processed. As another example, a specific key frame in the video data may be used as an image to be processed.

It should be noted that, in the case where a video frame image is extracted from video data as an image to be processed, and this operation is automatically performed by the electronic apparatus (that is, it is not the user who selects the video frame image in the video data), the electronic apparatus further needs to determine whether the extracted video frame image comprises an eye organ of the subject. In the case where the video frame image does not comprise the eye organ of the object, operations of the subsequent steps cannot be performed. Therefore the subsequent operations are not performed on the video frame image which does not comprise the eye organ of the object.

In some embodiments, the electronic apparatus may be deployed with an eye region identification model to identify whether the acquired video frame image or the acquired picture has an eye organ of the object. The aforementioned eye region identification model may be an identification model obtained by training with a large number of eye images, and in practical applications, the eye region identification model may be, for example, a convolutional neural network model.

In other applications of some embodiments of the present disclosure, in the case where it is the user who autonomously filtrates the video frame image in the video data to determine the image to be processed, the aforementioned eye region identification model may not be set.

In S102: adjusting an eye opening degree of an object in the image to be processed based on a preset image processing model to obtain a plurality of target images with the different eye opening degrees.

The preset image processing model is a model which is specially used for adjusting the eye opening degree of the object in the image to be processed to change pixel characteristics of the eye region of the object.

After the image to be processed is input into the preset image processing model, the preset image processing model performs image processing on the eye region of the object to change the degree of palpebral fissure of the eyelids in the eye region, and obtains target images with different eye opening degrees.

In some embodiments, the image processing model may automatically identify eye key point in the image to be processed, perform a pixel reconstruction operation based on the eye key point to form a plurality of images with different eye opening degrees.

Figure 2:
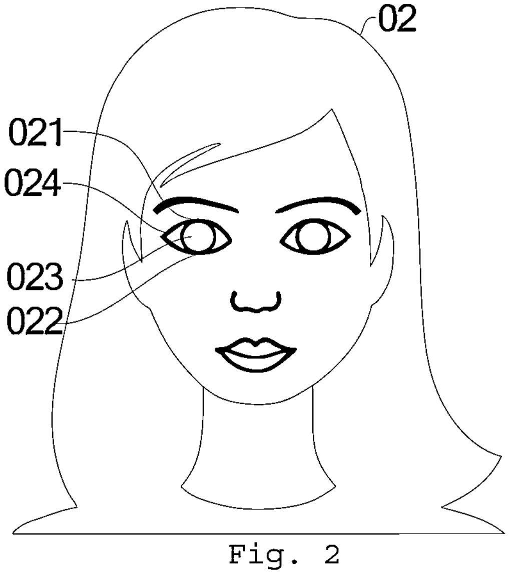
FIG. 2 is an image to be processed provided by some embodiments of the present disclosure.

FIG. 2 is an image to be processed provided by some embodiments of the present disclosure. As shown in FIG. 2, in the image to be processed shown in FIG. 2, eyes of an object 02 are naturally open, that is, an upper eyelid 021 and a lower eyelid 022 are naturally spaced, where an iris region 023 and eye white regions 024 on the left and right sides of the iris region 023 of the eyes of the object 02 can be seen, but the upper and lower eye white regions of the iris region cannot be seen.

The object's eye opening/closing degree in FIG. 2 may be indicated as 0.7 if a fully closed eye is indicated as 0.0 and a fully open eye is indicated as 1.0 (more pictorially a staring condition).

FIGS. 3A-3D are a plurality of target images with different eye opening degrees generated based on the image to be processed in FIG. 2. As shown in FIGS. 3A to 3D, the opening/closing degree of the eye in the target image is changed with respect to the image to be processed in FIG. 2.

The object in FIG. 3A has fully closed eyes (no iris region or eye white region of the object can be seen in the figure, but only fitting of the upper eyelid 021 and the lower eyelid 022 of the object can be seen), and the eye opening degree of the object can be indicated as 0.0.

The object in FIG. 3B has slightly open eyes (only the pupillary region in the iris 023 can be seen, as well as both the eye whites 024 outside the iris region 023), and the eye opening degree of the object can be indicated as 0.2.

The object in FIG. 3C has mostly open eyes (most of the iris region 023 can be seen, as well as the eye whites 024 on the left and right sides of the iris 023), and the eye opening degree of the object can be indicated as 0.5.

The object in FIG. 3D has fully open eyes (the entirety of the iris 023 can be seen, as well as the eye whites 024 around the iris region (up, down, left, and right)). At this time, the object is in a staring state, and the eye opening degree of the object can be indicated as 1.0.

In the foregoing embodiments of the present disclosure, an example of generating four target images is described. In other applications, the number of target images may not be limited to four.

In the foregoing embodiments of the present disclosure, the eye opening degree of each target image is also set in advance before the image processing model processes the image to be processed. In other embodiments of the present disclosure, the eye opening degree of each target image may not be set in advance, but randomly determined by the image processing device. Alternatively, only a maximum labeling value and a minimum labeling value of the eye opening degree of the target image are set (that is, a maximum eye opening degree and a minimum eye opening degree of the target image are set), and the eye opening degree of each target image is uniformly set by the image processing model according to the maximum labeling value, the minimum labeling value, and the number of target images that need to be generated.

In S103, generate a video with an eye gradual process based on the plurality of target images, the eye gradual process comprising at least one of an eye opening gradual process or an eye closing gradual process.

In some embodiments, the plurality of target images generated are sequentially sorted in an order in which the eye opening degree gradually increases or decreases, and then a video having a gradual effect of the eye opening degree is generated based on the sorting.

The method of the foregoing steps S101-S103 may be integrated into a specific application program or software tool. By providing the application program or software tool to the user, the user can be enabled to take a video having an eye opening/closing gradual effect, thus improving the interestingness of the video and enhancing the user experience.

Compared with the related art, the technical solution provided by the present disclosure has the following advantages: the video generation method and device provided by some embodiments of the present disclosure can generate, after acquiring the image to be processed, the plurality of target images with different eye opening degrees according to the image to be processed, and generate the video having the eye gradual process based on the plurality of target images. Some embodiments of the present disclosure enables the video taken by the user to have an eye opening/closing gradual effect by providing an application program or software tool to a user, thus improving the interestingness of the video and enhancing the user experience.

As described above, in some embodiments of the present disclosure, an image processing model is used to process an image to be processed to obtain a target image. The image processing model can be obtained by the following method.

A first training method comprises: an image processing model trained based on a plurality of training images with different eye opening degrees and eye opening degree data corresponding to each training image of the plurality of training images.

If the first training method is adopted, in order to train the image processing model, it is necessary to use images of the object with different eye opening degrees as training images, label, by a model trainer, the eye opening degrees on the training images and use the training images labeled with eye opening degree data as input to train the image processing model until the image processing model achieves a specific precision.

A second training method comprises: an image processing model is trained based on a plurality of training images with different eye opening degrees and an eye key point on each training image of the plurality of training images.

In a case where the second training method is adopted, in order to train the image processing model, it is necessary to use images of the object with different eye opening degrees as training images. Different from the first training method, the second training method does not label the eye opening degree data on the training images, but uses an image processing algorithm to obtain eye key point on the training images. For example, in one application, the training images may be processed using an eye region identification model to determine a minimum select box containing the eye region in the training images. The eye key point are then determined based on the minimum select box.

In order to train the image processing model, a large number of training images are required in some embodiments of the present disclosure, and the training images should comprise a plurality of images of the same object with different eye opening degrees. In actual practice, it is difficult to collect a plurality of images of the same object with different eye opening degrees.

In order to address the problem of difficulty in obtaining the training images, in some embodiments, the plurality of training images may be generated base on a plurality of fusion models. For example, for a certain eye opening degree, a corresponding fusion model is respectively set, and upon obtaining an image comprising a certain object (the image comprises pixels of the eye region of the object), the image is input to the fusion model to obtain a training image corresponding to the eye opening degree.

In some embodiments, the plurality of fusion models for generating the plurality of training images may be obtained by fusing a plurality of image generation models according to different weight ratios respectively, and the aforementioned plurality of image generation models are used for generating images with different eye opening degrees.

For example, the image generation model comprises a first model for generating an eye opening image and a second model for generating an eye closing image, and the first model and the second model are two models having completely identical model structures, with only different model parameters. In one application, both the first model and the second model may be antagonistic network models.

The first model may be trained based the eye opening images and the second model may be trained based on the eye closing images.

Based on the first model and the second model, in order to obtain fusion models which respectively generate different eye opening degrees, firstly, a first weight and a second weight are respectively set according to the eye opening degree corresponding to the fusion model; then, the first weight is multiplied by respective parameters in the first model to obtain a corresponding first temporary parameter, and the second weight is multiplied by respective parameters in the second model to obtain a corresponding second temporary parameter; the first temporary parameter and the second temporary parameter are added to obtain a fusion model parameter; and finally, the respective fusion model parameters are combined according to the frameworks of the first model and the second model and the placement positions of the corresponding parameters to obtain a corresponding fusion model.

In the foregoing embodiment, the fusion model is obtained based on fusion of two models (i.e., the first model and the second model). However, it will be appreciated that in other applications of embodiments of the present disclosure, the fusion model may also be obtained by fusing more than two models which are used for generating images with different eye opening degrees.

In the previously disclosed embodiments, the training images for training the image processing model are generated by the fusion model. In other applications of some embodiments of the present disclosure, the training images for training the image processing model may also be obtained by collection. For example, an object may be continuously shot using a high-speed camera to acquire still images of the object at respective eye opening degrees during blinking of the eye, and the still images may be used as training images.

In some embodiments, in addition to performing the aforementioned steps S101-S103, the electronic apparatus may also perform step S104 before performing step S102.

In S104, extract an eye key point of the object from the image to be processed, and processing the eyes of the object in the image to be processed into eyes with preset shape and/or preset size based on the eye key point.

In step S104, the method for extracting eye key point of an object from an image to be processed comprises the following steps.

Firstly, process training images using an eye region identification model, and determining a minimum select box containing an eye region in the training images; finally, determine eye key point based on the minimum select box.

Determining the eye key point based on the minimum select box comprises two methods: (1) taking a medial canthus, a lateral canthus, an upper eyelid extreme point and a lower eyelid extreme point of the eye as the eye key points; for example, adopting an edge identification method to identify an upper eyelid edge and a lower eyelid edge of the eye, then determining a medial canthus and a lateral canthus according to the upper eyelid edge and the lower eyelid edge, determining an upper eyelid extreme point according to the shape of the upper eyelid edge, and determining a lower eyelid extreme point according to the shape of the lower eyelid edge; (2) directly taking four corner points of the minimum select box as eye key points.

After the eye key points are determined, the eyes of the object in the image to be processed can be processed into the eyes with preset shape and/or preset size. Processing the eyes of the object in the image to be processed into the eyes with preset shape and/or preset size at least comprises the following method A and method B.

FIG. 4 is a flow chart of using method A to adjust a shape and size of an eye in the image to be processed. As shown in FIG. 4, method A comprises steps A1-A2.

In A1, determine a position of the eyes of the object in the image to be processed based on the eye key point.

The position of the eyes of the object in the image to be processed is determined according to the eye key point, for example, pixel coordinates at which the eye key point reside are determined, and then a region range of the eyes in the image and an inclination angle of the eyes are determined according to the pixel coordinates of the eye key point.

In A2, overlaying a preset eye image onto the position to replace the eyes of the object in the image to be processed with eyes in the preset eye image, wherein the eyes in the preset eye image have a preset shape and/or size.

The overlaying a preset eye image onto the position may comprise, for example: (1) determining how to adjust a size of a preset eye according to a region range of the eye in the image to be processed and a size of the preset eye image; in a case where the region range of the eye in the image is larger than the size of the preset eye image, amplifying the preset eye image; in a case where the region range of the eye in the image is smaller than the preset eye image, reducing the preset eye image; (2) rotating the preset eye image according to the inclination angle of the eye in the image; (3) and overlaying the adjusted preset eye image onto the position of the eyes of the object of the original image to replace the original eye in the image to be processed.

In Method B, adjust a position of the eye key point in the image to be processed based on a preset eye shape parameter and/or size parameter to enable the eye in the image to be processed to have a preset shape and/or a preset size.

In the method B, in order to adjust a shape and/or size of the eye to the preset shape and/or size, firstly it is necessary to determine an adjustment strategy of how to adjust the eye key point of the eye region to be processed according to the preset eye shape and/or size parameter and the actual eye region in the image to be processed, and then move the eye key point according to the adjustment strategy until the eye in the image to be processed is adjusted to a position of the preset shape and/or size.

For example, in a case where the preset eye size is larger than the image size of the image to be processed, an enlarging parameter may be determined according to the preset eye size and the size of the image to be processed, then the target pixel position of the eye key point may be determined according to the enlarging parameter and the pixel position of the eye key point in the image to be processed, and the modified and more natural image to be processed may be obtained by adjusting the eye key points to the target pixel positions and performing pixel filling, pixel replacement, or image smoothing based on the adjusted eye key points.

In some embodiments, method B may be used in a solution of taking an medial canthus, an lateral canthus, an upper eyelid extreme point and a lower eyelid extreme point of the eye as the eye key points.

For example, in some embodiments, take the medial canthus, the lateral canthus and the upper eyelid extreme point as control points of a quadratic bezier curve and take the quadratic bezier curve as the edge of the upper eyelid, the adjustment of the pattern of the quadratic bezier curve can be realized by changing the positions of the medial canthus, the lateral canthus and the upper eyelid extreme point, and then the adjusted position of the upper eyelid edge can be determined. Similarly, the adjusted position of the lower eyelid edge may be controlled based on the medial canthus, the lateral canthus, and the lower eyelid extreme point. After the adjustment of the eyelid, the size of the iris region of the user can be adjusted, and the color filling of the iris region and the white eye regions between the upper eyelid and the lower eyelid is realized.

As mentioned above, in step S102, the eye opening degree of the object to be processed is adjusted based on the preset image processing model, so as to obtain a plurality of target images with different eye opening degrees. For example, the following cases may be comprised.

In the case where the one or more images to be processed comprises a plurality of images, the processing may be performed in a first mode and a second mode.

The first mode is as follows: inputting each image to be processed and target eye opening degree data randomly generated for each image to be processed into an image processing model, and enabling the image processing model to adjust each image to be processed based on the target eye opening degree data corresponding to each image to be processed so as to obtain a target image with the eye opening degree matched with the target eye opening degree data; wherein the eye opening degree data for a certain image to be processed may be one or multiple data; in a case where there is multiple eye opening degree data, the image processing model generates a corresponding target images according to each of the eye opening degree data respectively.

The second mode is as follows: for each image to be processed, determining a value of a preset parameter when the image is input into the image processing model, and taking the value of the preset parameter at the moment as the target eye opening degree data corresponding to the image; then, inputting the target eye opening degree data corresponding to the image into the image processing model, so that the image processing model adjusts the eye opening degree based on the target eye opening/closing degree data, so as to obtain a target image with the eye opening degree matched with the target eye opening degree data.

In the second mode, the value of the preset parameter is a gradually-changing numerical value which can gradually change within a set range. In one application of some embodiments of the present disclosure, a display interface of an electronic apparatus may be provided with a target control, and the target control may be used for setting a configuration parameter of the preset parameter. The method for acquiring the configuration parameter of the preset parameter based on the target control comprises the following steps: (1) acquiring configuration data of the preset parameter based on a target control displayed on an interface; in some embodiments of the present disclosure, the configuration data of the preset parameter comprises a changing amplitude and a changing period, that is, the preset parameter periodically changes within a specific changing range according to a set period: (2) and determining a value of the preset parameter when the image is input into the image processing model based on the changing amplitude and the changing period.

In a case where the image to be processed comprises only one image, this may be performed in a third mode.

The third mode is as follows: inputting the image and the multiple different target eye opening degree data into the image processing model, so that the image processing model respectively adjusts the eye opening degree of the object in the image based on each target eye opening degree data so as to obtain a target image corresponding to each target eye opening degree data.

Figure 5:
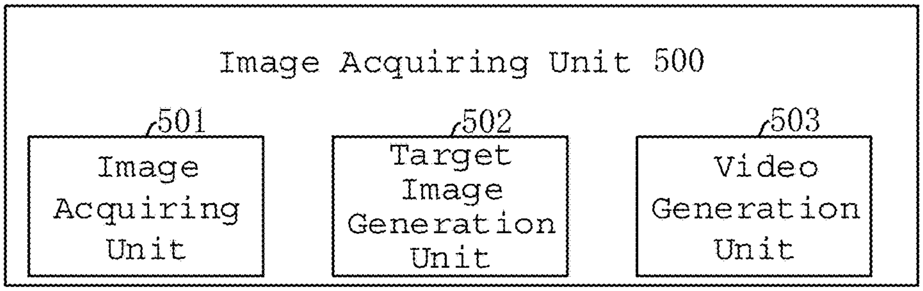
FIG. 5 is a schematic structural diagram of a video generation device provided in some embodiments of the present disclosure.

FIG. 5 is a schematic structural diagram of a video generation device provided in some embodiments of the present disclosure. As shown in FIG. 5, a video generation device 500 provided by some embodiments of the present disclosure comprises an image acquisition unit 501, a target image generation unit 502, and a video generation unit 503.

The image acquisition unit 501 is used for acquiring one or more images to be processed.

The target image generation unit 502 is used for adjusting an eye opening degree of the object in the image to be processed based on a preset image processing model, so as to obtain a plurality of target images with the different eye opening degrees.

The video generation unit 503 is used for generating a video with an eye gradual process based on the plurality of target images, the eye gradual process comprising at least one of an eye opening gradual process or an eye closing gradual process.

In some embodiments, the image processing model is trained based on a plurality of training images with different eye opening degrees and eye opening degree data corresponding to each training image of the plurality of training images.

In some embodiments, the image processing model is trained based on a plurality of training images with different eye opening degrees and an eye key point on each training image of the plurality of training images.

In some embodiments, the plurality of training images are generated based on a plurality of fusion models, the plurality of fusion models are obtained by fusing a plurality of image generation models according to different weight ratios, and the images generated by different image generation models have different degrees of opening of eyes.

In some embodiments of the present disclosure, the aforementioned plurality of image generation models comprise a first model for generating an eye opening image and a second model for generating an eye closing image.

In some embodiments, the video generation device 500 further comprises an image modification unit for extracting an eye key point of the object from the image to be processed, and processing eyes of the object in the image to be processed into preset-shaped and/or sized eyes based on the eye key point.

In some embodiments, the image modification unit comprises a position determining subunit and a first image modification subunit.

The position determining subunit is used for determining a position of the eyes of the object in the image to be processed based on the eye key point.

The first image modification subunit is used for overlaying a preset eye image onto the position to replace the eyes of the object in the image to be processed with eyes in the preset eye image, wherein the eyes in the preset eye image have a preset shape and/or size.

In some embodiments, the image modification unit further comprises a second image modification subunit which adjusts a position of the eye key point in the image to be processed based on a preset eye shape parameter and/or size parameter, so that the eye in the image to be processed can have a preset shape and/or size.

In some embodiments, the target image generation unit 502 inputs, in a case where the one or more images to be processed comprises a plurality of images, for each image of the one or more images to be processed, the image and the target eye opening degree data generated randomly for the image into the image processing model, so that the image processing model adjusts the eye opening degree of the object in the image based on the target eye opening degree data, so as to obtain a target image with the eye opening degree matched with the target eye opening degree data.

In some embodiments, the target image generation unit 502 determines, in a case where the one or more images to be processed comprises a plurality of images, for each image of the one or more images to be processed, a value of a preset parameter when the image is input to the image processing model, and takes the value as target eye opening degree data corresponding to the image, the value of the preset parameter gradually changing; and inputs the target eye opening degree data corresponding to the image into the image processing model, so that the image processing model adjusts the eye opening degree of the object in the image based on the target eye opening degree data so as to obtain a target image with the eye opening degree matched with the target eye opening degree data.

In some embodiments, the video generation device 500 further comprises a variation range determining unit and a target image generation unit 502.

The variation range determining unit is used for acquiring configuration data of the preset parameter based on a target control displayed on an interface, the configuration data comprising a changing amplitude and a changing period;

the target image generation unit 502 is used for determining a value of the preset parameter when the image is input to the image processing model based on the changing amplitude and the changing period.

In some embodiments, in a case where the one or more images to be processed comprises one image, the target image generation unit 502 inputs the image and multiple different target eye opening degree data into the image processing model, so that the image processing model adjusts the eye opening degree of the object in the image based on each said target eye opening degree data, respectively, so as to obtain a target image corresponding to each said target eye opening degree data.

The video generation device 500 provided in this embodiment can perform the method of any of the embodiments of the foregoing video generation method, and the performing mode and the beneficial effects are similar, which are not described herein again.

Some embodiments of the present disclosure further provides an electronic apparatus, which comprises a processor and a memory, where the memory stores a computer program therein, and when the computer program is executed by the processor, the video generation method of any of the above embodiments may be implemented.

Figure 6:
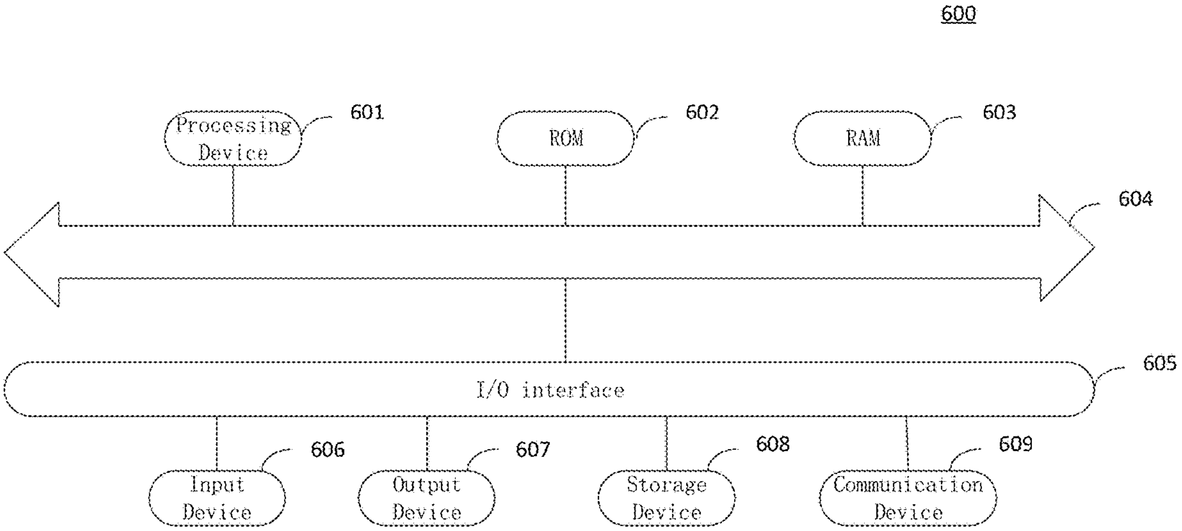
FIG. 6 is a schematic structural diagram of an electronic apparatus in some embodiments of the present disclosure.

For example, FIG. 6 is a schematic structural diagram of an electronic apparatus in some embodiments of the present disclosure. Referring below specifically to FIG. 6, a schematic structural diagram is shown that is adaptive for implementing an electronic apparatus 600 in some embodiments of the present disclosure. The electronic apparatus 600 in some embodiments of the present disclosure may comprise, but is not limited to, a mobile terminal such as a mobile phone, a notebook computer, a digital broadcast receiver, a personal digital assistant (PDA), a tablet computer (PAD), a portable multimedia player (PMP), a vehicle mounted terminal (e.g., a car navigation terminal), and the like, and a fixed terminal such as a digital TV, a desktop computer, and the like. The electronic apparatus shown in FIG. 6 is only an example, and should not bring any limitation to the functions and the scope of use of the embodiments of the present disclosure.

As shown in FIG. 6, the electronic apparatus 600 may comprise a processing device (e.g., a central processing unit, a graphics processor, etc.) 601 that may perform various appropriate actions and processing in accordance with a program stored in a Read Only Memory (ROM) 602 or a program loaded from a storage device 608 into a Random Access Memory (RAM) 603. In the RAM 603, various programs and data necessary for the operation of the electronic apparatus 600 are also stored. The processing device 601, the ROM 602, and the RAM 603 are connected to each other via a bus 604. An input/output (I/O) interface 605 is also connected to bus 604.

Generally, the following devices may be connected to the I/O interface 605: an input device 606 comprising, for example, a touch screen, a touch pad, a keyboard, a mouse, a camera, a microphone, an accelerometer, a gyroscope, or the like; an output device 607 comprising, for example, a Liquid Crystal Display (LCD), a speaker, a vibrator, or the like; a storage device 608 comprising, for example, a magnetic tape, a hard disk, or the like; and a communication device 609. The communication device 609 may allow the electronic apparatus 600 to perform wireless or wired communication with other apparatus so as to exchange data. While FIG. 6 illustrates an electronic apparatus 600 having various devices, it is to be understood that not all illustrated devices are required to be implemented or provided. More or fewer devices may be alternatively implemented or provided.

In some embodiments, the present disclosure provides a computer program comprising: instructions which, when executed by a processor, cause the processor to perform a video generation method according to any of the above-described embodiments.

In some embodiments, the present disclosure provides a computer program product comprising instructions which, when executed by a processor, cause the processor to perform a video generation method according to any of the above-described embodiments.

In particular, the process described above with reference to the flow chart may be implemented as a computer software program, according to some embodiments of the present disclosure. For example, some embodiments of the present disclosure comprises a computer program product comprising a computer program carried on a non-transitory computer readable medium, the computer program containing program code for performing the method illustrated by the flow chart. In such an embodiment, the computer program may be downloaded and installed from a network via the communication device 609, or installed from the storage device 608, or installed from the ROM 602. The computer program, when executed by the processing device 601, performs the above-described functions defined in the method of some embodiments of the present disclosure.

It should be noted that the above-described computer readable medium of the present disclosure may be a computer readable signal medium or a computer readable storage medium or any combination of both. A computer readable storage medium may be, for example, but not limited to, an electronic, magnetic, optical, electromagnetic, infrared, or semiconductor system, device, or component, or any combination of the above. A more specific example of the computer readable storage medium may comprise, but is not limited to an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage component, a magnetic storage component, or any suitable combination of the above. In the present disclosure, a computer readable storage medium may be any tangible medium that can contain or store a program for use by or in connection with an instruction execution system, device, or component. In contrast, in the present disclosure, a computer readable signal medium may comprise a propagated data signal with computer readable program code carried therein, in baseband or as part of a carrier wave. Such a propagated data signal may take a variety of forms, comprising, but not limited to, an electromagnetic signal, an optical signal, or any suitable combination of the above. A computer readable signal medium may be any computer readable medium excluding a computer readable storage medium, which can communicate, propagate, or transport a program for use by or in connection with an instruction execution system, apparatus, component, or a combination thereof. Program code contained on a computer readable medium may be transported using any appropriate medium, comprising but not limited to electrical wires, optical cables, radio frequency (RF), etc., or any suitable combination of the above.

In some embodiments, clients and servers may communicate using any currently known or future developed network Protocol, such as a Hyper Text Transfer Protocol (HTTP), and may be interconnected with digital data communication (e.g., a communication network) in any form or medium. Examples of communication networks comprise a local area network ("LAN"), a wide area network ("WAN"), the Internet (e.g., the Internet), and peer-to-peer networks (e.g., ad hoc peer-to-peer networks), as well as any currently known or future developed network.

The above described computer readable medium may be contained in the above described electronic apparatus, or may be separately present and not incorporated into the electronic apparatus.

The above described computer readable medium carries one or more programs which, when executed by the electronic apparatus, cause the electronic apparatus to acquire an image to be processed, adjust an eye opening degree of an object in the image to be processed based on a preset image processing model to obtain a plurality of target images with the different eye opening degrees, and generate a video with an eye gradual process based on the plurality of target images.

Computer program code for performing operations of the present disclosure may be written in one or more programming languages or a combination thereof, comprising but not limited to an object oriented programming language such as Java, Smalltalk, C++, and comprising a conventional procedural programming language, such as the "C" programming language or a similar programming language. The program code may be executed entirely on the user's computer, partly on the user's computer, as a stand-alone software package, partly on the user's computer and partly on a remote computer, or entirely on the remote computer or server. In a case involving the remote computer, the remote computer may be connected to the user's computer through any type of network, comprising a Local Area Network (LAN) or a Wide Area Network (WAN), or connected to an external computer (for example, through the Internet using an Internet service provider).

The flow charts and block diagrams in the figures illustrate the architecture, functionality, and operation of possible implementations of systems, methods and computer program products according to various embodiments of the present disclosure. In this regard, each block in the flow chart or block diagram may represent a module, a segment, or a portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flow chart, and combinations of blocks in the block diagram and/or flow chart, can be implemented by special purpose hardware-based systems that perform the specified functions or acts, or by combinations of special purpose hardware and computer instructions.

The units described in the embodiments of the present disclosure may be implemented by means of software or hardware. In particular, the name of a unit does not in some cases constitute a limitation on the unit itself.

The functions described herein above may be performed, at least in part, by one or more hardware logic components. For example, without limitation, exemplary types of hardware logic components that may be used comprise: field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of the present disclosure, a machine readable medium may be a tangible medium that can contain, or store a program for use by or in connection with an instruction execution system, device, or apparatus. The machine readable medium may be a machine readable signal medium or a machine-readable storage medium. A machine readable medium may comprise, but is not limited to, an electronic, magnetic, optical, electromagnetic, infrared, or semiconductor system, device, or apparatus, or any suitable combination of the above. More specific examples of a machine-readable storage medium would comprise an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

Some embodiments of the present disclosure further provide a non-volatile computer readable storage medium, where a computer program is stored in the storage medium, and when the computer program is executed by a processor, the method in any one of the embodiments of FIG. 1 to FIG. 4 may be implemented, where an execution mode and beneficial effects of the method are similar, and are not described herein again.

It is noted that, in this document, relational terms such as "first" and "second" and the like, are used solely to distinguish one entity or action from another entity or action without necessarily requiring or implying any actual such relationship or order between such entities or actions. Also, the terms "comprises" "comprises" or any other variation thereof, are intended to cover a non-exclusive inclusion, such that a process, method, article, or apparatus that comprises a list of elements does not comprise only those elements but may comprise other elements not expressly listed or inherent to such process, method, article, or apparatus. Without further limitation, an element defined by the phrase "comprising an . . . " does not exclude the presence of other identical elements in the process, method, article, or apparatus that comprises the element.

The previous description is only for the purpose of describing particular embodiments of the present disclosure, so as to enable those skilled in the art to understand or implement the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A video generation method, comprising:

acquiring one or more images to be processed;

adjusting an eye opening degree of an object in the image to be processed based on a preset image processing model to obtain a plurality of target images with different eye opening degrees; and generating a video with an eye gradual process based on the plurality of target images, the eye gradual process comprising at least one of an eye opening gradual process or an eye closing gradual process, wherein the adjusting the eye opening degree of the object in the image to be processed based on the preset image processing model to obtain the plurality of target images with the different eye opening degrees comprises:

inputting, in response to the one or more images to be processed comprising a plurality of images, each image of the plurality of images and target eye opening degree data randomly generated for the each image into the image processing model;

adjusting the eye opening degree of the object in the each image by using the image processing model based on the target eye opening degree data; and obtaining a target image with an eye opening degree matched with the target eye opening degree data.

2. The video generation method according to claim 1, wherein the image processing model is trained based on a plurality of training images with the different eye opening degrees and eye opening degree data corresponding to each training image of the plurality of training images.

3. The video generation method according to claim 1, wherein the image processing model is trained based on a plurality of training images with the different eye opening degrees and an eye key point on each training image of the plurality of training images.

4. The video generation method according to claim 2, wherein the plurality of training images are generated based on a plurality of fusion models, the plurality of fusion models are obtained by fusing a plurality of image generation models according to different weight ratios, and images generated by different image generation models have the different eye opening degrees.

5. The video generation method according to claim 4, wherein the plurality of image generation models comprise a first model for generating an eye opening image and a second model for generating an eye closing image.

6. The video generation method according to claim 1, before the adjusting the eye opening degree of the object in the image to be processed based on the preset image processing model to obtain the plurality of target images with the different eye opening degrees, the method further comprises:

extracting an eye key point of the object from the image to be processed; and processing eyes of the object in the image to be processed into at least one of eyes with a preset shape or eyes with a preset size based on the eye key point.

7. The video generation method according to claim 6, wherein the processing the eyes of the object in the image to be processed into at least one of the eyes with the preset shape or the eyes with the preset size based on the eye key point comprises:

determining a position of the eyes of the object in the image to be processed based on the eye key point; and overlaying a preset eye image onto the position to replace the eyes of the object in the image to be processed with eyes in the preset eye image, wherein the eyes in the preset eye image with at least one of the preset shape or the preset size.

8. The video generation method according to claim 6, wherein the processing the eyes of the object in the image to be processed into at least one of the eyes with the preset shape or the eyes with the preset size based on the eye key point comprises:

adjusting a position of the eye key point in the image to be processed based on at least one of a preset eye shape parameter or a preset eye size parameter to make the eyes in the image to be processed have at least one of the preset shape or the preset size.

9. The video generation method according to claim 6, wherein the adjusting an eye opening degree of the object in the image to be processed based on the preset image processing model to obtain the plurality of target images with the different eye opening degrees comprises:

for each image of the one or more images to be processed, determining a value of a preset parameter when the each image is input into the image processing model, in a case where the one or more images to be processed comprises a plurality of images, and taking the value as target eye opening degree data corresponding to the each image, the value of the preset parameter gradually changing; and inputting the target eye opening degree data corresponding to the each image into the image processing model to make the image processing model adjust an eye opening degree of the object in the each image based on the target eye opening degree data to obtain a target image with an eye opening degree matched with the target eye opening degree data.

10. The video generation method according to claim 9, before the determining the value of the preset parameter when the each image is input into the image processing model, and the method further comprises:

acquiring configuration data of the preset parameter based on a target control displayed on an interface, the configuration data comprising a changing amplitude and a changing period, wherein the determining the value of the preset parameter when the each image is input into the image processing model comprises:

determining the value of the preset parameter when the each image is input into the image processing model based on the changing amplitude and the changing period.

11. The video generation method according to claim 6, wherein the adjusting the eye opening degree of the object in the image to be processed based on the preset image processing model to obtain the plurality of target images with the different eye opening degrees comprises:

inputting the one or more images to be processed and multiple different target eye opening degree data into the image processing model, in a case where the one or more images to be processed comprises one image, to make the image processing model adjust the eye opening degree of the object in the one image based on the different target eye opening degree data respectively to obtain the plurality of target images corresponding to the different target eye opening degree data.

12. An electronic apparatus, comprising:

a memory and a processor, wherein the memory has stored therein a computer program which, when executed by the processor, implements a video generation method comprising:

acquiring one or more images to be processed;

adjusting an eye opening degree of an object in the image to be processed based on a preset image processing model to obtain a plurality of target images with different eye opening degrees; and generating a video with an eye gradual process based on the plurality of target images, the eye gradual process comprising at least one of an eye opening gradual process or an eye closing gradual process, wherein the adjusting the eye opening degree of the object in the image to be processed based on the preset image processing model to obtain the plurality of target images with the different eye opening degrees comprises:

inputting, in response to the one or more images to be processed comprising a plurality of images, each image of the plurality of images and target eye opening degree data randomly generated for the each image into the image processing model;

adjusting the eye opening degree of the object in the each image by using the image processing model based on the target eye opening degree data; and obtaining a target image with an eye opening degree matched with the target eye opening degree data.

13. A non-transitory computer readable storage medium having stored therein a computer program which, when executed by a processor, implements a video generation method comprising:

acquiring one or more images to be processed;

adjusting an eye opening degree of an object in the image to be processed based on a preset image processing model to obtain a plurality of target images with different eye opening degrees; and generating a video with an eye gradual process based on the plurality of target images, the eye gradual process comprising at least one of an eye opening gradual process or an eye closing gradual process, wherein the adjusting the eye opening degree of the object in the image to be processed based on the preset image processing model to obtain the plurality of target images with the different eye opening degrees comprises:

inputting, in response to the one or more images to be processed comprising a plurality of images, each image of the plurality of images and target eye opening degree data randomly generated for the each image into the image processing model;

adjusting the eye opening degree of the object in the each image by using the image processing model based on the target eye opening degree data; and obtaining a target image with an eye opening degree matched with the target eye opening degree data.

14. The electronic apparatus according to claim 12, wherein the image processing model is trained based on a plurality of training images with the different eye opening degrees and eye opening degree data corresponding to each training image of the plurality of training images.

15. The electronic apparatus according to claim 12, wherein the image processing model is trained based on a plurality of training images with the different eye opening degrees and an eye key point on each training image of the plurality of training images.

16. The electronic apparatus according to claim 14, wherein the plurality of training images are generated based on a plurality of fusion models, the plurality of fusion models are obtained by fusing a plurality of image generation models according to different weight ratios, and images generated by different image generation models have the different eye opening degrees.

17. The electronic apparatus according to claim 16, wherein the plurality of image generation models comprise a first model for generating an eye opening image and a second model for generating an eye closing image.

18. The electronic apparatus according to claim 12, wherein before the adjusting the eye opening degree of the object in the image to be processed based on the preset image processing model to obtain the plurality of target images with the different eye opening degrees, the processor implements steps of:

extracting an eye key point of the object from the image to be processed; and processing eyes of the object in the image to be processed into at least one of eyes with a preset shape or eyes with a preset size based on the eye key point.

19. The electronic apparatus according to claim 18, wherein the processor implements steps of:

determining a position of the eyes of the object in the image to be processed based on the eye key point; and overlaying a preset eye image onto the position to replace the eyes of the object in the image to be processed with eyes in the preset eye image, wherein the eyes in the preset eye image with at least one of the preset shape or the preset size.

* * * * *